_United States Patent Office_

2,766,168
Patented Oct. 9, 1956

2,766,168

POLYCHLORO-POLY(DIALKOXYTHIONOPHOS-PHONYL-THIO)-1,4-DITHIANES

Albert H. Haubein, Christiana, Del., assignor to Hercules Powder Company, Wilmington, Del., a corporation of Delaware No Drawing. Application August 30, 1955,
Serial No. 531,601

13 Claims. (Cl. 167—33)

This invention relates to new and useful organic dithiophosphate compounds and to pesticidal compositions containing the same.

The novel organic dithiophosphate compounds of this invention have the general formula

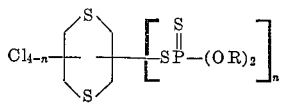

in which each R represents a lower alkyl radical and $n$ is a number from 1 to 2.

These organic dithiophosphate compounds have pesticidal properties and distinguish themselves in being highly toxic at low concentrations toward certain pests and in having a much longer residual toxicity toward mites when sprayed on plants normally attacked by such pests.

The organic dithiophosphate compounds of this invention are made by reacting a tetrachlorodithiane with the desired diester of dithiophosphoric acid. The diester of dithiophosphoric acid may be reacted directly with the tetrachlorodithiane or it may be reacted in the form of its salt or in the presence of materials which sequester the hydrogen chloride set free in the reaction.

The methods of making the products of this invention and methods of using the products as pesticides are more particularly described in the following examples in which all parts and percentages are by weight.

*Example 1*

Tetrachlorodithiane was prepared by adding four moles chlorine gas over a one hour period to dithiane in carbon tetrachloride while maintaining a temperature of 55–80° C. and driving off hydrogen chloride as liberated. The tetrachlorodithiane produced in this chlorination was recovered by distilling off the carbon tetrachloride. The chlorination efficiency is about 100% and the product is quite pure since further chlorination of the tetrachlorodithiane is slow.

To a stirred solution of 16 parts pyridine in 100 parts benzene containing 0.2 part hydroquinone dissolved therein was added at 30–40° C. 42 parts 0,0-diethyl dithiophosphoric acid. To the resulting salt solution was then added 26 parts tetrachlorodithiane prepared as above. The mixture was then refluxed for six hours at about 80° C. during which time pyridine hydrochloride separated. At the end of this time, water was added to dissolve the water-soluble salts and the organic layer was further purified by washing first with 10% aqueous sodium hydroxide solution and then with fresh water until neutral. After drying over anhydrous sodium sulfate, the solvent benzene was removed under reduced pressure and the residue was topped at 80° C./0.4 mm. The residue which was the bis(diethyl dithiophosphate) of dichlorodithianedithiol, also designated dichlorodithianedithiol S,S-bis(O,O-diethyl phosphorodithioate), amounted to about 44 parts and had the following analysis: P, 10.6%, S, 36.1%, Cl 13.3%; calc'd: P, 12.2%, S, 37.8% Cl, 13.9%.

An emulsifiable concentrate of the residue was made by mixing one gram of the residue with 1 ml. benzene and 1 ml. sorbitan monolaurate polyoxyalkylene derivative (Tween 20). This concentrate was then diluted with water to form dispersions of the residue in water varying in concentration from 1.0% to 0.025%. The dispersions were then tested for their toxicity to caged insects and to mites not only by spraying the insects but by spraying the plants alone as well for the purpose of determining residual toxicity. Standard test methods were used for obtaining the results set forth below.

When pea aphids were sprayed with a 0.1% emulsion of the composition of this example on pea seedlings sprayed simultaneously with the same emulsion, there resulted 100% mortality in 48 hours.

Activity tests were also run by spraying lima bean seedlings infested with two-spotted mites to run off with 0.1% aqueous emulsion. There resulted 100% mortality to the mites.

The toxicity to flies was 96% using a 0.1% emulsion.

*Example 2*

Trichlorodithianethiol S(O,O-diethyl dithiophosphorodithioate) was prepared from tetrachlorodithiane prepared as in Example 1 which was reacted with O,O-diethyl dithiophosphoric acid following the procedure of Example 1 using, however, twice as much of the tetrachlorodithiane. This resulted in the production of a product analyzing: P, 8.4%, S, 33.2%, Cl, 21.7%; calc'd: P, 7.6%, S, 31.4%, Cl, 26.0%. Toxicity tests run on this product were substantially the same as those run on the product of Example 1.

*Examples 3 and 4*

Dichlorodithianedithiol S,S-bis(O,O-dimethyl phosphorodithioate) and dichlorodithianedithiol S,S-bis(O,O-diisopropyl phosphorodithioate) prepared following the procedure of Example 1 had only slightly less toxicity toward pea aphids than the product of Example 1.

*Examples 5 and 6*

Trichlorodithianemonothiol S(O,O-dimethyl phosphorodithioate) and trichlorodithianemonothiol S(O,O-diisopropyl phosphorodithioate) prepared following the procedure of Example 2 had only slightly less toxicity toward pea aphids than the product of Example 2.

The organic dithiophosphate compounds of the formula

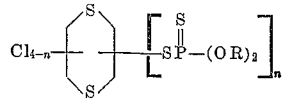

are those in which $n$ is a number from 1 to 2 and each R is the same or a different lower alkyl radical such as methyl, ethyl, propyl or butyl. The radicals which are especially effective are those with 1 to 3 carbon atoms in the radical. The preferred compounds are those in which the alkyl radical is ethyl. Optimum activity is also found in those compounds in which $n=2$.

In producing the compounds of this invention, the reaction between the tetrachlorodithiane and the ester of dithiophosphoric acid or its salts is carried out by heating the two reactants at a temperature at which reaction takes place but below the decomposition temperature in the range of 20° to 200° C., preferably in the range of 30° to 110° C. The reactants may be mixed in any desired order. In order to get complete reaction, it is preferable to use an excess over the theoretical amount of the ester of the dithiophosphoric acid. When the reaction is complete, the excess ester of the dithiophosphoric acid is readily removed by washing with water containing sufficient alkali to produce the water-soluble salt.

The reaction is preferably carried out in nonaqueous media. Organic solvents are desirable to aid in control of the reaction. Suitable solvents include benzene, toluene, xylene, ketones, anhydrous alcohol solvents and dioxane. It is preferable to use aromatic hydrocarbon or ketone solvents when using an amine salt of the dithiophosphoric acid ester or when using an amine or ammonia as a sequestering reagent. After the reaction is complete, the solvent is readily removed by distillation.

When the diester of dithiophosphoric acid is used as the free acid in the reaction with the tetrachlorodithiane, hydrogen chloride which is liberated is preferably sequestered by adding a material to combine with the hydrogen chloride as formed. It is convenient to use pyridine for this purpose. However, in its place other tertiary organic amines may be used, and they may be added in equivalent amount at the beginning of the reaction or gradually during the course of the reaction. Likewise, the amine can be reacted with the diester of the dithiophosphoric acid prior to carrying out the reaction with the tetrachlorodithiane as in Example 1. Amines which can be used include pyridine, tertiary alkylamines such as trimethylamine, tributylamine, triamylamine, dimethylaniline, and the like. Inorganic bases may also be used. These include ammonia, alkali metal hydroxides, carbonates and bicarbonates, and alkaline earth metal hydroxides and carbonates.

As in the case of organic bases, the inorganic bases may also be used first to form a salt of the ester of the dithiophosphoric acid. When the salt of the ester of dithiophosphoric acid is used as the reactant, it is preferable to use a salt which is soluble in the organic solvent used for the reaction. The organic salts of amines are particularly satisfactory because of the good solubility of these salts in the nonreactive hydrocarbon solvents. When the free acid is reacted with the tetrachlorodithiane, the alkaline material is preferably added gradually as needed, but it can be added all at once if desired. Ammonia is suitably added gradually as a gas; the solids are suitably added in finely divided form.

The dithiophosphoric acid ester is produced by reacting the lower aliphatic alcohol, which is to form a part of the ester, with $P_2S_5$ preferably in a nonreactive solvent such as benzene, toluene, xylene, hexane or cyclohexane and removing the $H_2S$ which is liberated. The reaction is carried out at any temperature in the range of 50° to 120° C., selecting the lowest practical temperature without decomposition. If different radicals are desired for the various R radicals, a mixture of alcohols may be used in the production of the dithiophosphoric acid ester. Likewise, dithiophosphoric acid esters produced from different alcohols can be mixed for use in the reaction with the tetrachlorodithiane. The esters of dithiophosphoric acid used in preparation of the compounds of this invention are thus made from individual alcohols or mixtures of alcohols having 1–4 carbon atoms. Included among such alcohols are methanol, ethanol, propanol-1, and propanol-2.

The methods by which the products of this invention are isolated will vary slightly with the reactants used and the product produced. In some instances, the chloride salt split out in the reaction separates and can be filtered off. In other instances, the chloride salt is best removed by washing with water. The excess salt of the ester of dithiophosphoric acid is also removed by the water wash. The benzene or other solvent is then removed by distillation leaving an insecticidally active residue. Further purification by selective solvent extraction or by adsorptive agents such as activated carbon, or clays, can precede the removal of the solvent. Likewise, an organic solvent can be added to aid in the purification by adsorptive agents. However, the product is generally satisfactory for use as a pesticide without further purification.

The compounds of this invention are used as the sole toxic agent in pesticidal formulations or in admixture with other toxicants for modification of the properties of the individual toxicants. They may be used, for example, in admixture with toxaphene, DDT, Thanite, chlordane, rotenone, pyrethrum, and the like in many of the formulations suggested below.

The compounds of this invention are made into pesticidal compositions for use against insects and mites by dilution with an insecticidal adjuvant as a carrier therefor, by dispersing in organic solvent, or in water, or by diluting with a solid insecticidal adjuvant as a carrier. Dispersions containing a surface-active dispersing agent have the advantage of spreading the toxic substance more effectively over the plant surface. Dispersions in organic solvents include dispersions in alcohols, pine oil, hydrocarbon solvents, difluorodichloromethane, and similar organic solvents. The compounds of this invention are also used in aerosol formulations in which difluorodichloromethane and similar aerosol propellants form the propellant vehicle.

Aqueous dispersions are made up from the compounds of this invention, a surface-active dispersing agent and water as the essential ingredients. The amount of the compounds of this invention in the aqueous dispersions when diluted for spraying of plants will be in the range of about 10% to about 0.001% of the aqueous dispersion.

The aqueous dispersion will ordinarily be made up from a concentrate, and the concentrate will be dispersed in water to the proper concentration for application to the plants to be treated in the field. The concentrate is composed essentially of the compound of this invention and a surface-active dispersing agent. The concentrate may also contain sufficient amounts of organic solvents to aid in effective dispersion. The amount of surface-active dispersing agent used is usually at least 5% of the amount of toxic compound in the concentrate.

Suitable surface-active dispersing agents for use in the compositions of this invention are those disclosed in Chemistry of Insecticides, Fungicides, and Herbicides (Donald E. H. Frear, Second Edition (1948), pages 280–287) for use with known insecticides and include neutral soaps of resin, alginic and fatty acids and alkali metals or alkylamines or ammonia, saponins, gelatins, milk, soluble casein, flour and soluble proteins thereof, sulfite lye, lignin pitch, sulfite liquor, long-chain fatty alcohols having 12–18 carbon atoms and alkali metal salts of the sulfates thereof, salts of sulfated fatty acids, salts of sulfonic acids, esters of long-chain fatty acids and polyhydric alcohols in which alcohol groups are free, clays such as fuller's earth, China clay, kaolin, Attapulgite, and bentonite and related hydrated aluminum silicates having the property of forming a colloidal gel. Among the other surface-active dispersing agents which are useful in the compositions of this invention are the omega-substituted polyethylene glycols of relatively long-chain length, particularly those in which the omega substituent is aryl, alkyl, or acyl. Compositions of the toxic material and surface-active dispersing agent will in some instances have more than one surface-active dispersing agent for a particular type of utility, or in addition to a surface-active dispersing agent, hydrocarbons such as kerosene and mineral oil will also be added as improvers. Thus, the toxic material may contain a clay as the sole adjuvant or clay and hydrocarbon, or clay and another surface-active dispersing agent to augment the dispersing action of the clay. Likewise, the toxic material may have water admixed therewith along with the surface-active dispersing agent, sufficient generally being used to form an emulsion. All of these compositions of toxic material and surface-active dispersing agent may contain in addition synergists and/or adhesive or sticking agents.

What I claim and desire to protect by Letters Patent is:

1. As a new composition of matter a compound of the formula

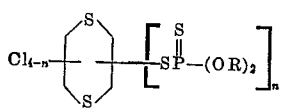

in which each R represents an alkyl radical having 1–4 carbon atoms and $n$ is a number from 1 to 2.

2. As a new composition of matter a compound of the formula

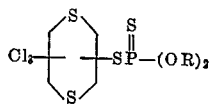

where R represents an alkyl radical having 1–4 carbon atoms.

3. As a new composition of matter a compound of the formula

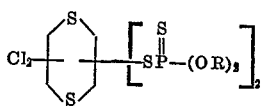

where R represents an alkyl radical having 1–4 carbon atoms.

4. As a new composition of matter a compound of the formula

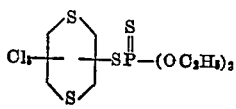

5. As a new composition of matter a compound of the formula

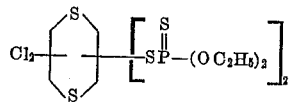

6. A pesticidal composition comprising the compound of claim 1 and an insecticidal adjuvant.
7. A pesticidal composition comprising the compound of claim 2 and an insecticidal adjuvant.
8. A pesticidal composition comprising the compound of claim 3 and an insecticidal adjuvant.
9. A pesticidal composition comprising the compound of claim 4 and an insecticidal adjuvant.
10. A pesticidal composition comprising the compound of claim 5 and an insecticidal adjuvant.
11. As a new composition of matter a compound of the formula

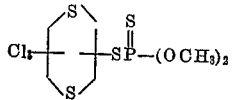

12. As a new composition of matter a compound of the formula

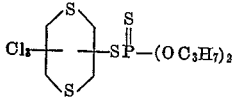

13. As a new composition of matter a compound of the formula

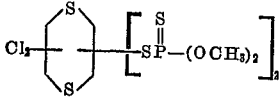

No references cited.